G. W. MARBLE,
Assignor to A. SHOENINGER.
Velocipede.
No. 9,707. Reissued May 17, 1881.
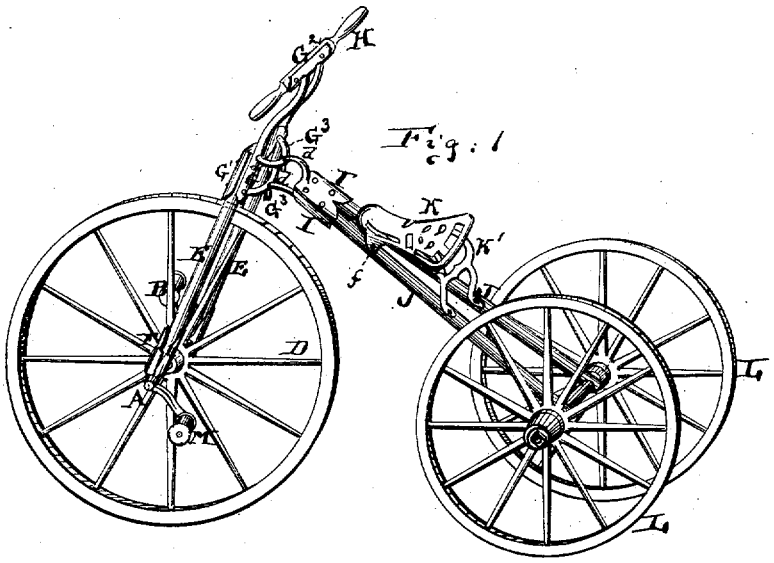
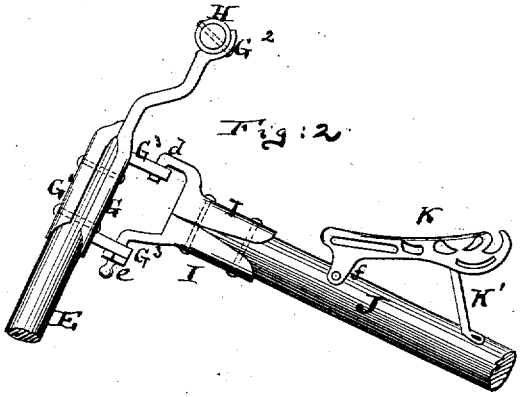
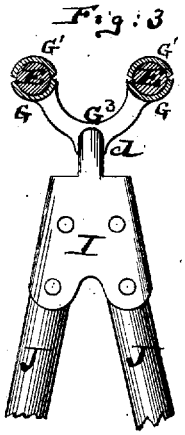
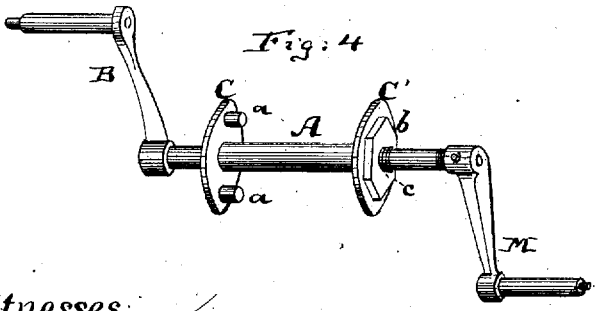
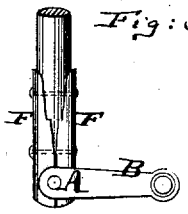
Witnesses:
John C. Tunbridge.
Henry F. Parker.
Inventor
George W. Marble
by his attorney
A. v. Briesen
N. PETERS, Photo-Lithographer, Washington, D. C.

UNITED STATES PATENT OFFICE.

GEORGE W. MARBLE, OF CHICAGO, ILLINOIS, ASSIGNOR TO ADOLPH SHOENINGER, OF SAME PLACE.

VELOCIPEDE.

SPECIFICATION forming part of Reissued Letters Patent No. 9,707, dated May 17, 1881.

Original No. 171,623, dated December 28, 1875. Application for reissue filed November 18, 1880.

*To all whom it may concern:*

Be it known that I, GEORGE W. MARBLE, of Chicago, in the county of Cook and State of Illinois, have invented an Improvement in Velocipedes, of which the following is a specification.

The nature of my invention relates to an improvement in velocipedes of the tricycle variety, and has for its object to construct a light, strong, and durable vehicle for boys' use, and to simplify and reduce the cost of construction.

The invention consists in the peculiar construction and combination of the various parts, as more fully hereinafter set forth, and indicated in the claims.

Figure 1 is a perspective view. Fig. 2 is a side elevation of the joint between the reach and standard. Fig. 3 is a sectional plan of the same. Fig. 4 is a perspective view of the driving-shaft with its stationary and loose collars and cranks. Fig. 5 is a side elevation of a driving-box at the foot of one standard, and of a pedal-crank.

In the drawings, A represents the forward or driving axle, having two cranks, B and M, and two collars, C and C′. The collar C has two projecting studs, *a a*, adapted to enter one end of the hub of the front wheel, D, and is stationary on the axle A. The crank B, nearest the collar C, is also stationary on said axle. The collar C′ is movable on the axle. The hub is clamped firmly on the axle by the loose collar C′, which is forced up by a nut, *b*, run on a screw-thread, *c*, that is cut on the axle. When the wheel D has thus been secured the crank M is properly fastened to the axle.

The bifurcated standard is composed of two rods, E, of turned hard wood, whose lower ends are received in a socket composed of two semi-cylindric plates, F, having one-half of the axle-journal box formed in the lower end of each. The axle is journaled in the boxes so formed at the lower ends of the standard-rods. The tops of said rods are received in two socket-plates, G G′, the former of which is cast with a rod curved upward and backward, and terminates in a horizontal socket-plate, $G^2$, which connects the two and also receives a turned wooden tiller, H, secured thereto by two bolts or rivets. The ends of the standard-rods are also secured in their respective sockets by bolts or rivets, as shown. The socket-plates G G are further connected together by two cross-girts, $G^3$, cast with them in one piece, with a hole drilled through the middle of each girt to receive a pintle, *d*, that is attached to the fore ends of two socket-plates, I, which are so shaped as to receive the front ends of two turned wooden reach-rods, J J, whose rear ends carry the rear axle, that has mounted on it the hind wheels, L L. The lower end of the pintle *d* is prevented from coming out of its hole by a nut, *e*, forming a very strong but easy-working coupling.

K is a saddle-shaped seat, having two short legs, *f*, under the front corners, which rest upon and are riveted to the reach-rods. The rear end of the seat is supported by a metallic frame, K′, riveted to its under side, and has its corner legs riveted to the reach-rods. By bending the legs the same seat can be fitted to velocipedes of various sizes.

It will be noticed that all the wooden parts are turned in the lathe, and that the socket-plates afford a sure and strong fastening without mortising or tenoning any portion of the work to which said socket-plates are attached.

I am aware that forked tubes have already been used in velocipedes—as, for example, in Patent No. 88,507—and do not claim them.

I claim—

1. In a velocipede, substantially as described, the axle A, carrying the stationary collar C, having pins *a*, and the stationary crank B, all made in one piece, in combination with the loose collar C′ and nut *b*, substantially as herein shown and described.

2. The castings G, G′, $G^2$, and $G^3$, forming a connection for the top of the standard, the tiller, and a means for coupling the reach, substantially as set forth.

3. The hollow socket-plates G G, united by cross-girts $G^3$, and combined with the pintle *d* and with the standard-rods E E and reach-rods J, substantially as herein shown and described.

4. The combination of the socket-plates I I, adapted to inclose and hold firmly together the ends of the reach-rods, the pintle *d* on such plates, and the castings G G′ $G^3$, forming a connection between the reach-rods and the standard, all constructed and arranged substantially as described and shown.

5. A velocipede of the class described, having the reach and standard constructed of separate solid round rods, joined together by metallic plates, that form sockets for receiving the round ends of said rods, substantially as described and shown.

6. In a velocipede, the combination of the bifurcated standard E, composed of separate round rods, whose upper and lower ends are fitted in separate metallic sockets, with the reach, composed of separate round rods, whose front ends are secured in metallic sockets, and of a pintle joining the reach-sockets to the upper sockets, G G′, of the standard, the lower sockets of the standard serving, also, as bearings for the front axle, substantially as herein shown and described.

GEO. W. MARBLE.

Witnesses:
JNO. T. ERWIN,
WM. M. DURELL.